United States Patent
Kozlov et al.

(10) Patent No.: US 8,125,564 B2
(45) Date of Patent: Feb. 28, 2012

(54) STABILIZED CAMERA PLATFORM SYSTEM

(75) Inventors: Vladimir V. Kozlov, Moscow (RU); Lev N. Yevstratov, Los Angeles, CA (US); Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 1355 days.

(21) Appl. No.: 11/735,088

(22) Filed: Apr. 13, 2007

(65) Prior Publication Data

US 2007/0182813 A1 Aug. 9, 2007

Related U.S. Application Data

(62) Division of application No. 10/654,848, filed on Sep. 4, 2003, now abandoned.

(51) Int. Cl.
H04N 5/225 (2006.01)

(52) U.S. Cl. ... 348/373; 348/375; 224/185; 248/123.11; 248/187.1; 248/585; 396/419; 396/428

(58) Field of Classification Search .. 348/208.99–208.5, 348/208.7, 373–375; 224/185; 248/123.11, 248/187.1, 585; 396/419, 428
See application file for complete search history.

(56) References Cited

U.S. PATENT DOCUMENTS

| | | |
|---|---|---|
| 2,961,877 A | 11/1960 | Edwards |
| 3,035,477 A | 5/1962 | Bosch et al. |
| 3,069,912 A | 12/1962 | Faux et al. |
| 3,167,648 A | 1/1965 | Heath |
| 3,218,015 A | 11/1965 | Baer |
| 3,378,326 A | 4/1968 | Alvarez |
| 3,437,397 A | 4/1969 | Humphrey |
| 3,473,861 A | 10/1969 | Humphrey |
| 3,504,957 A | 4/1970 | Heffinger et al. |
| 3,552,216 A | 1/1971 | Pasquet et al. |
| 3,556,632 A | 1/1971 | Doramond |
| 3,643,345 A * | 2/1972 | Wilton et al. ............. 434/44 |
| 3,703,999 A | 11/1972 | Forys et al. |
| 3,845,929 A | 11/1974 | Reekie et al. |
| 4,208,028 A * | 6/1980 | Brown et al. ............ 224/185 |
| 4,256,279 A | 3/1981 | Duel |
| 4,488,249 A | 12/1984 | Baker |

(Continued)

FOREIGN PATENT DOCUMENTS

CH 515480 12/1971

(Continued)

OTHER PUBLICATIONS

Chapman/Leonard Studio Equipment Inc. 2003-04 Equipment Catalogue, pp. 99-101; 104-105 (Sep. 2002).

*Primary Examiner* — David Ometz
*Assistant Examiner* — Carramah J Quiett
(74) *Attorney, Agent, or Firm* — Perkins Coie LLP (57) ABSTRACT

A stabilized camera system has a roll frame formed as a parallelogram linkage and pivotably attached to a pan frame. A tilt frame is pivotably attached to the roll frame. Control circuits are provided to compensate for drift, to allow manual aiming of the camera during stabilized camera operation, and for providing rapid leveling. The stabilized camera system is compact with low moments of inertia to allow rapid movements.

16 Claims, 7 Drawing Sheets

U.S. PATENT DOCUMENTS

| | | | |
|---|---|---|---|
| 4,821,043 A | 4/1989 | Leavitt | |
| 4,989,466 A | 2/1991 | Goodman | |
| 5,124,938 A | 6/1992 | Algrain | |
| 5,835,193 A | 11/1998 | Romanoff et al. | |
| 5,856,862 A | 1/1999 | Kokush | |
| 5,868,031 A | 2/1999 | Kokush et al. | |
| 5,871,249 A | 2/1999 | Williams | |
| 6,091,453 A * | 7/2000 | Coan et al. | 348/373 |
| 6,154,317 A | 11/2000 | Segerstrom et al. | |
| 6,611,662 B1 | 8/2003 | Grober | |
| 6,702,805 B1 * | 3/2004 | Stuart | 606/1 |
| 7,137,747 B2 * | 11/2006 | Chapman | 396/428 |
| 7,522,213 B2 * | 4/2009 | Chapman | 348/373 |
| 2003/0133013 A1 * | 7/2003 | Maeda et al. | 348/143 |

FOREIGN PATENT DOCUMENTS

| | | |
|---|---|---|
| DE | 1230237 | 12/1966 |
| DE | 1260617 | 2/1968 |
| FR | 1263424 | 5/1961 |
| FR | 2175927 | 10/1973 |
| GB | 1115832 | 5/1968 |
| GB | 1251566 | 10/1971 |
| GB | 1353285 | 5/1974 |
| GB | 1491117 | 11/1977 |
| SU | 355494 | 11/1970 |
| SU | 893006 A | 8/1980 |
| SU | 989321 | 6/1981 |
| SU | 1259775 | 8/1984 |
| SU | 1455838 | 2/1985 |

\* cited by examiner

STABILIZED CAMERA PLATFORM SYSTEM

This application is a divisional of U.S. patent application Ser. No. 10/654,848, filed Sep. 4, 2003, now abandoned and incorporated herein by reference.

BACKGROUND

The field of the invention is stabilized platforms and systems for cameras.

In motion picture, television or video filming or recording, the camera is often supported on a vehicle, to follow an action or moving sequence to achieve a desired camera angle or effect, or to film occupants in or on the vehicle. Various specialized camera cars, camera trucks, cranes, and dollys have been used for this purpose. In addition, specialized camera support systems have been used to mount cameras on aircraft such as airplanes and helicopters, and on watercraft, such as boats, floats, or buoys.

In filming or recording with motion picture or television or video cameras, it is important for the camera to be maintained in a stable position. In the most basic form, camera stability has been achieved by mounting the camera on a tri-pod. However, when the camera itself is mounted on and moves with a vehicle, maintaining camera stability often becomes difficult. For example, with a camera mounted on a camera car moving along a roadway and filming or recording a fixed subject on the ground, e.g., a building, or a subject which is also moving e.g., another moving vehicle, the camera and the lens of the camera will necessarily move in unintended and undesirable ways, due to various factors. These factors may include changes in the roadway direction or inclination, changes in the vehicle orientation, due to shifting gravitational or inertial loads, as well as for other reasons. Undesirable movement can be especially problematic when the camera is mounted on an aircraft, where movement readily occurs along three dimensions, and where wind buffeting of the camera can be extreme. The undesirable camera lens movement resulting from these factors reduces the quality of the filmed or recorded images, by causing the images to be improperly framed, or to appear jumpy or erratic.

Production time can be extremely expensive. Even relatively short, simple film or video sequences, such as a scene in a motion picture or television production, or a TV commercial, generally requires large numbers of film or video production professionals, such as directors, actors, camera crew, grips, lighting and sound personnel, prop, background set, make-up and wardrobe personnel, etc. Consequently, even the loss of one minute of production time can translate into hundreds or thousands of dollars in increased production costs. If special effects, stunts, large numbers of extras, animal actors, etc. are involved, costs can be even higher. Accordingly, any techniques that avoid delays in filming or re-shooting, are very advantageous.

Existing camera stabilization systems have various other disadvantages as well, relating to balancing, large moments of inertia, controls, accuracy of positioning and other factors. Accordingly, various engineering challenges remain in designing an improved camera stabilization system.

SUMMARY

After extensive research and development, the various engineering challenges described above associated with stabilized camera systems have now been overcome in a new system providing significantly improved performance and advantages. These advantages include a compact design, precise positioning, and improved performance features and characteristics.

In a first aspect, a stabilized camera system includes a roll or dutch frame pivotably attached to a pan frame. The roll or dutch frame includes a parallelogram linkage. A tilt frame is pivotably attached to the parallelogram linkage of the roll frame. This results in a more compact and lightweight design. With this design, the camera system can also be more quickly and easily installed and balanced.

In additional aspects, electronically controlled fluid dampening head characteristics, stabilization, drift compensation, and other functions may be provided. The invention resides as well in subcombinations and subsystems of the components, elements, and steps described. Additional objects, features and advantages will appear below. Accordingly, it is an object of the invention to provide an improved stabilized camera head and system.

BRIEF DESCRIPTION OF THE DRAWINGS

In the drawings, wherein the same element number indicates the same element in each of the views.

DETAILED OF DESCRIPTION OF THE DRAWINGS

Figure 1:
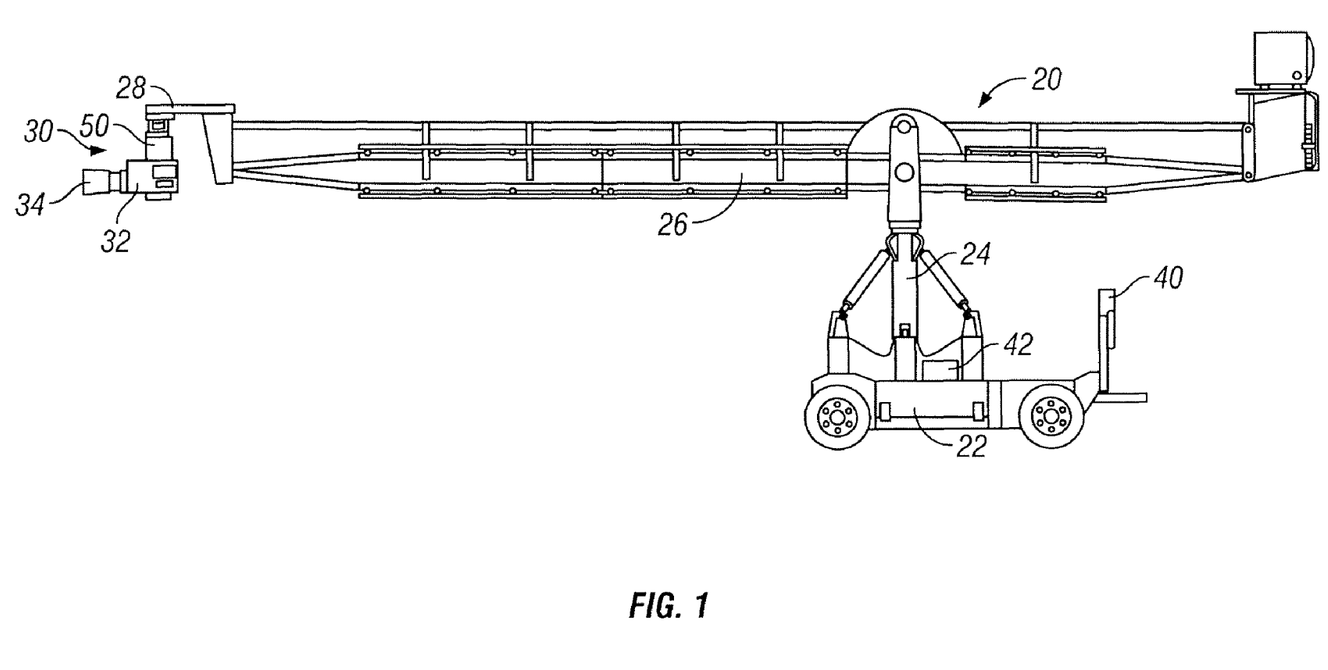
FIG. 1 is a side view of a camera and camera stabilization system mounted on a camera crane.

Turning now in detail to the drawings, as shown in FIG. 1, a camera 32 having a lens 34 is supported on a camera stabilization system 30 at the front end of an arm 26 of a camera crane 20. The camera crane arm 26 is pivotably supported on a mast 24 on a mobile base 22. FIG. 1 accordingly shows one example of the use of the camera stabilization system 30 with a camera 32. The stabilization system 30 may also be used on various other types of platforms or supports, including camera cars, camera trucks, camera dollys, aircraft, watercraft, and virtually any other vehicle, base or support where stabilization is desirable.

Figure 2:
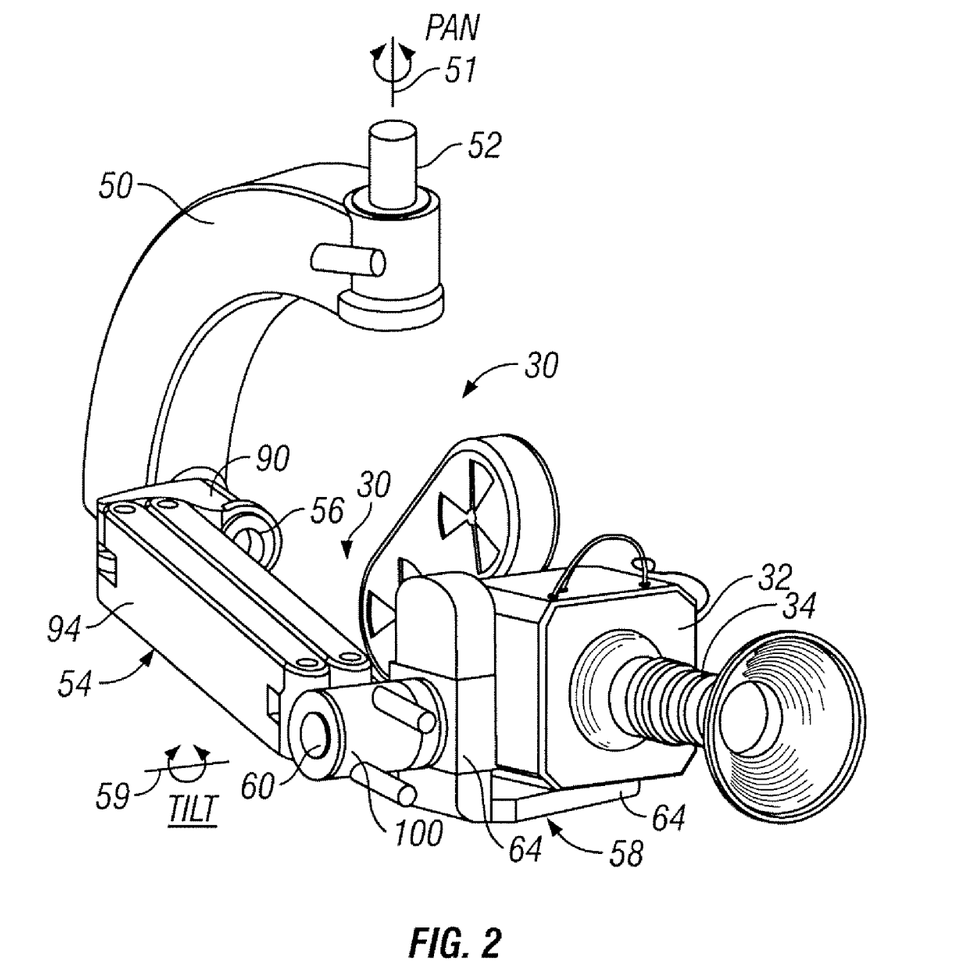
FIG. 2 is a front and left side perspective view of the camera system shown in FIG. 1.
Figure 3:
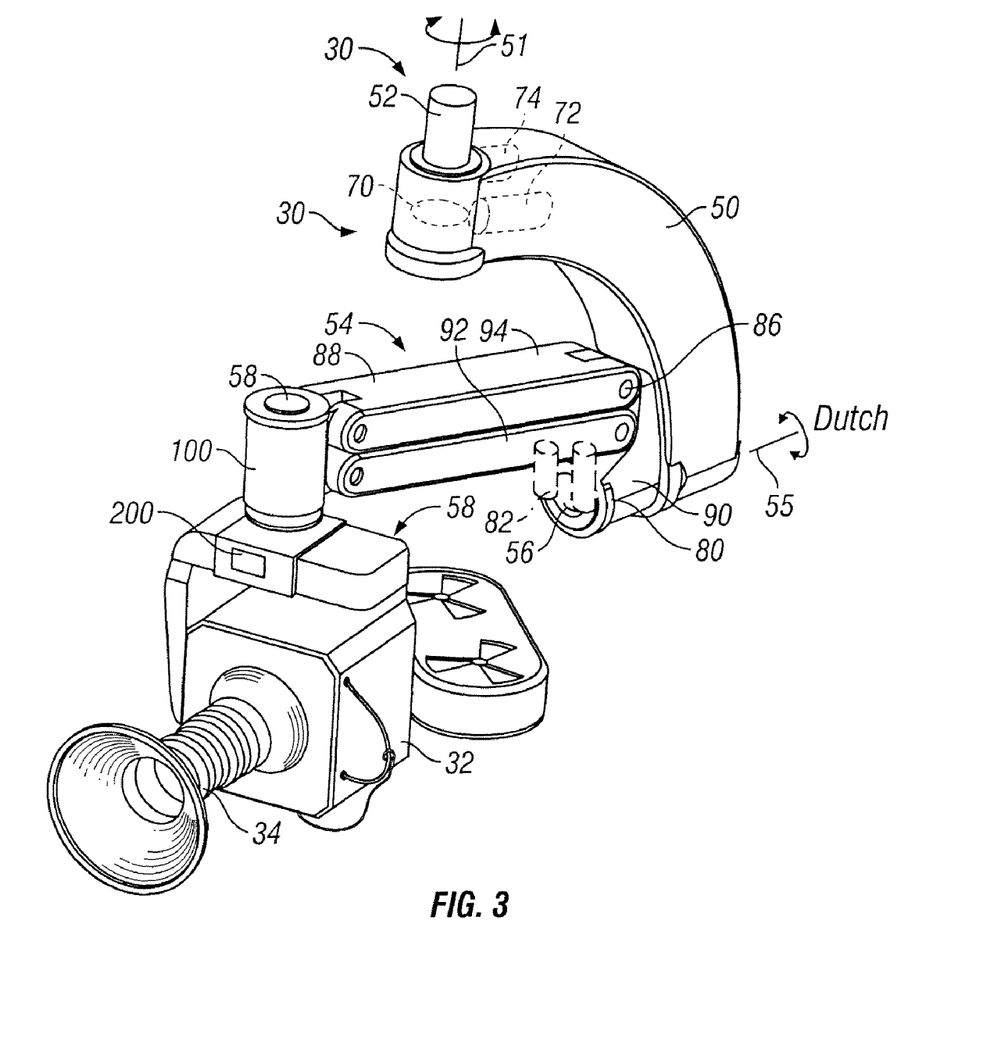
FIG. 3 is a front and right side perspective view thereof.

Turning now to FIGS. 2 and 3, the support system 30 includes a pan frame 50 preferably formed as a hollow arcuate or curved box section. A pan shaft 52 is rigidly attached (e.g., welded, bolted or pinned) to a front support plate 28 of the camera crane 20 or other support vehicle or structure. The pan frame 50 can pivot or rotate on the pan shaft 52 about a pan axis 51, as shown in FIG. 2.

Referring still to FIGS. 2 and 3, a dutch or roll frame 54 is attached to a roll collar 90 having a roll shaft 56 extending into the lower end of the pan frame 50. The roll frame 54 is pivotable or rotatable about a roll axis 55 shown in FIG. 3. The roll frame 54 preferably includes a parallelogram linkage 88 having first and second parallel links 92 and 94. The back ends of the links 92 and 94 are attached to the roll collar 90 with locking bolts 86. Similarly, the front ends of the roll links 92 and 94 are attached to a tilt collar 100 with locking bolts 86. The locking bolts 86 are loosened during balancing or set-up, to properly position the roll frame 54. The locking bolts 86 are then tightened, at four places, to provide a rigid connection between the roll collar 90 and the tilt collar 100. The roll frame 54 requires no other internal or external components, such as springs, dampeners, etc.

Figure 8:
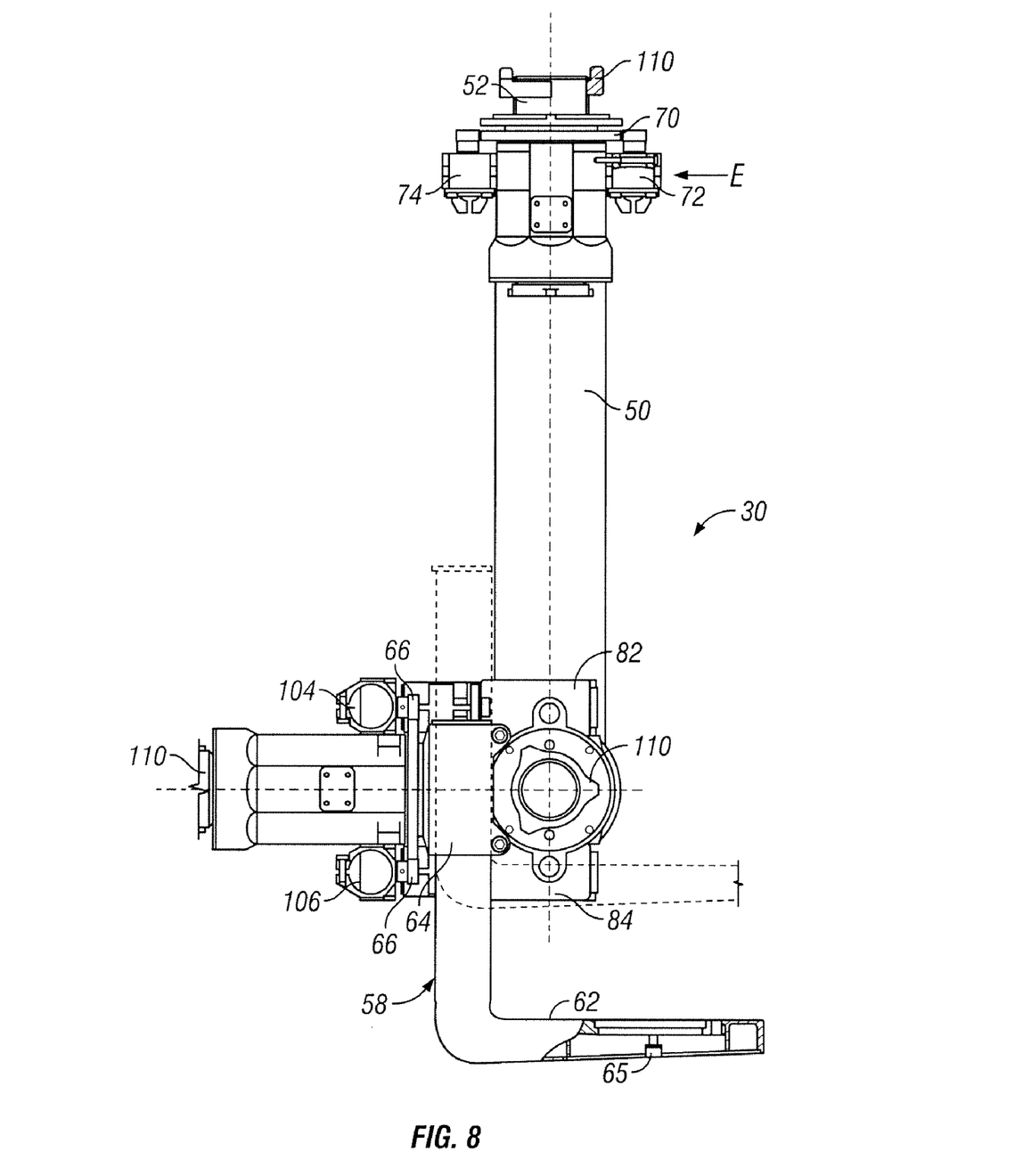
FIG. 8 is a front view thereof with the camera removed, for purpose of illustration.

Referring still to FIGS. 2 and 3, a tilt frame 58 has a tilt shaft 60 extending into the tilt collar 100. The tilt frame 58 is pivotable about a tilt axis 59, shown in FIG. 2. Referring to FIG. 2 and momentarily to FIG. 8, the tilt frame 58 includes an L-shaped camera platform 62. The camera 32 is secured onto the platform 62 via standard screws or bolts. The vertical leg of the camera platform 62, as shown in FIG. 8, extends through a sleeve 64 joined to the tilt collar 100. The vertical position of the camera platform 62 (and of the camera 32) can be adjusted by loosening sleeve bolts 66, vertically positioning the camera platform 62 as desired and then tightening the sleeve bolts 66.

Figure 4:
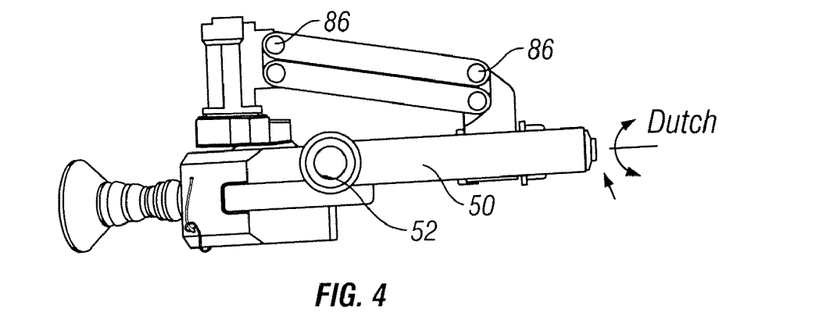
FIG. 4 is a plan view of the camera system shown in FIGS. 2 and 3.
Figure 5:
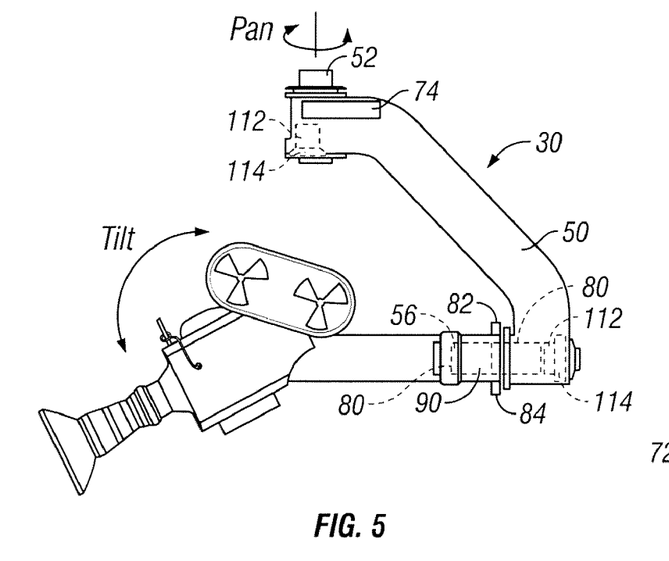
FIG. 5 is a left side elevation view thereof.
Figure 6:
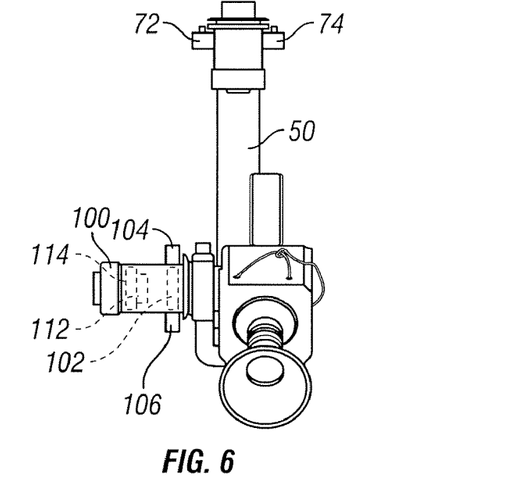
FIG. 6 is a front view thereof.
Figure 7:
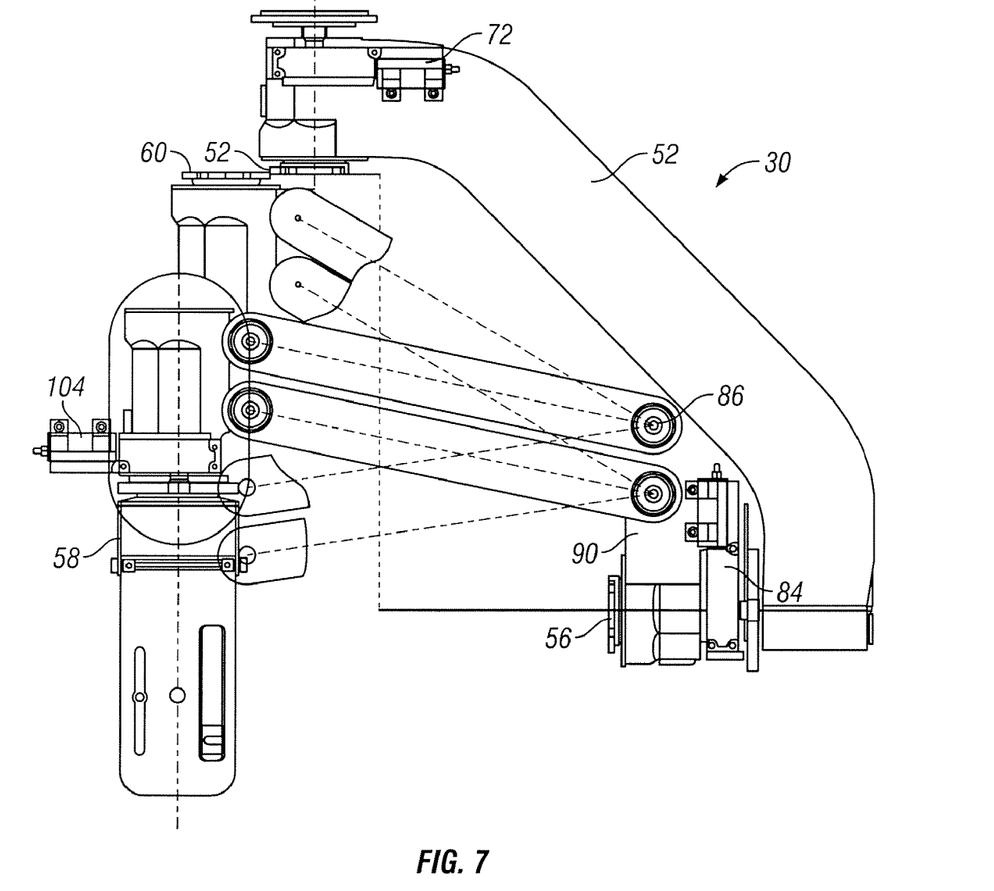
FIG. 7 is a schematically illustrated side view of the present camera support system showing alternative positions.

Referring now in addition to FIGS. 4, 5, and 6, a pair of drive motor assemblies 72, 74 is provided to drive the pan frame 50, the roll frame 54, and the tilt frame 58. While the six drive motor assemblies used in the system 30 are preferably the same, to provide a more clear description, each of the motors is separately referred to and numbered based on its location and function in the system 30. Referring momentarily to FIG. 15, a drive motor assembly 75 includes an electric motor 76 which drives an output gear 79 through a speed reducing gear train 78.

Referring to FIGS. 2, 3, and especially FIG. 6, the pan shaft 52 is preferably fixed in place (e.g., bolted, welded, etc.) on the support plate 28 and does not pivot or rotate. A pan shaft gear 70 is rigidly attached to or part of the pan shaft 52. The pan shaft gear 70 is preferably located within the pan frame 50, although it may also be external. The pan frame 50 is rotatably supported on the pan shaft 52 via bearings. First and second pan motor assemblies 72 and 74 are attached to the outside of the pan frame 50. The output gear 79 of each of the pan motor assemblies 72 and 74 engages or meshes with the pan shaft gear 70. Consequently, the electric motors 76 of the pan motor assemblies 72 and 74 are positioned to exert torque on the pan frame about the pan axis 51.

A similar design is provided for rotation about the dutch or roll axis 55 and the tilt axis 59. As shown in FIGS. 3 and 5, the dutch or roll shaft 56 is rotatably supported via bearings to the lower end of the pan frame 50. A roll shaft gear 80 is fixed to the pan frame 50. First and second roll axis motors 82 and 84 are attached to the outside of the roll collar 90. The output gear 79 of each of the roll axis motors 82 and 84 is engaged with the roll shaft gear 80. Consequently, the roll axis motors 82 and 84 are positioned to exert torque on the dutch or roll frame 54 about the dutch or roll axis 55.

In a similar way, as shown in FIG. 6, the tilt axis shaft 60 is rotatably supported on bearings in the tilt collar 100 at the front end of the roll frame 54. A tilt shaft gear 102 is irrotatably attached to the tilt collar 100. First and second tilt motor assemblies 104 and 106 are attached to the outside of the tilt collar 100. The output gear 79 of each tilt motor 104 and 106 meshes with the tilt shaft gear 102. Consequently, the tilt motors 104 and 106 are positioned to exert torque on the tilt frame 58 about the tilt axis 59. Each of the motor assemblies described 72, 74, 82, 84, 104, and 106 is preferably the same as the motor assembly 75 shown in FIGS. 15-18. The positions of the motor assemblies and gears, whether inside or outside of the frames, is immaterial to the invention and may be selected based on design choice.

Referring to FIG. 3, by locating the dutch or roll axis motors 82 and 84 on the dutch collar 90, the stabilization system 30 is made more compact and lightweight. As the weight of the system 30 is reduced, it has less inertia. This reduced inertia reduces the torque requirements of the stabilization system. Consequently, the system 30 can have smaller motors, use less electrical power, have less friction, and provide more accurate stabilization. In addition, the placement of the motors 72, 74, 82, 84, 104, and 106 close to the axis of rotation 51, 55, and 59 reduces the angular moment of inertia of the pan frame 50, dutch or roll frame 54, and tilt frame 58, also providing for rapid stabilizing movements.

Preferably, the motor assemblies are powered and controlled by cables or wires extending back from the stabilization system 30 to an electronics box 42 containing circuitry and a power supply. A control panel or box 40 is connected to the electronics box 42 preferably via cables. Alternatively, wireless connections may be used. If desired, slip rings and/or slip-type electrical connectors or fittings can be used to minimize wind-up of the cables.

As shown in FIGS. 4, 5, and 6, to prevent excessive wind-up of the cables, a stopping or limiting mechanism 112 is provided within the system 30 about each of the axis. Typically, the limiting mechanism 112 will allow e.g., only two or three complete 360° revolutions. The limiting device 112 typically includes several interlocking rings, as is well-known in the art. A locking device 114 is also provided for each axis. The locking mechanism 114 is used during storage, shipment, set-up or calibration and locks each of the frames into a zero (or other preset) angle position. The locking mechanisms 114 are generally disengaged when the system 30 is in use.

Referring to FIGS. 2-8, the term gimbal refers to the mechanical linkage of the pan, roll and tilt frames and their interconnections. In use, the camera 32 is attached to the tilt frame 54. The vertical position of the tilt frame 54 is adjusted as desired by positioning the vertical or upright arm of the tilt frame 58 in the sleeve 64 and tightening the sleeve bolts 66. The camera is then balanced side to side or laterally on the tilt frame and locked into position via the bolts 65 shown in FIG. 8. Balancing is continued by loosening the roll frame locking bolts 86 and then moving the tilt frame .58 carrying the camera 32 side to side, until there is zero torque acting about the roll axis 55. The roll collar 90 and roll frame 54 are then pivoted 90° from the position shown in FIG. 2 to the position shown in FIG. 3. The center of gravity of payload, i.e., the camera 32 is then again moved from, side to side until zero torque results about the roll axis 55. The locking bolts 86 are then tightened.

Figure 9:
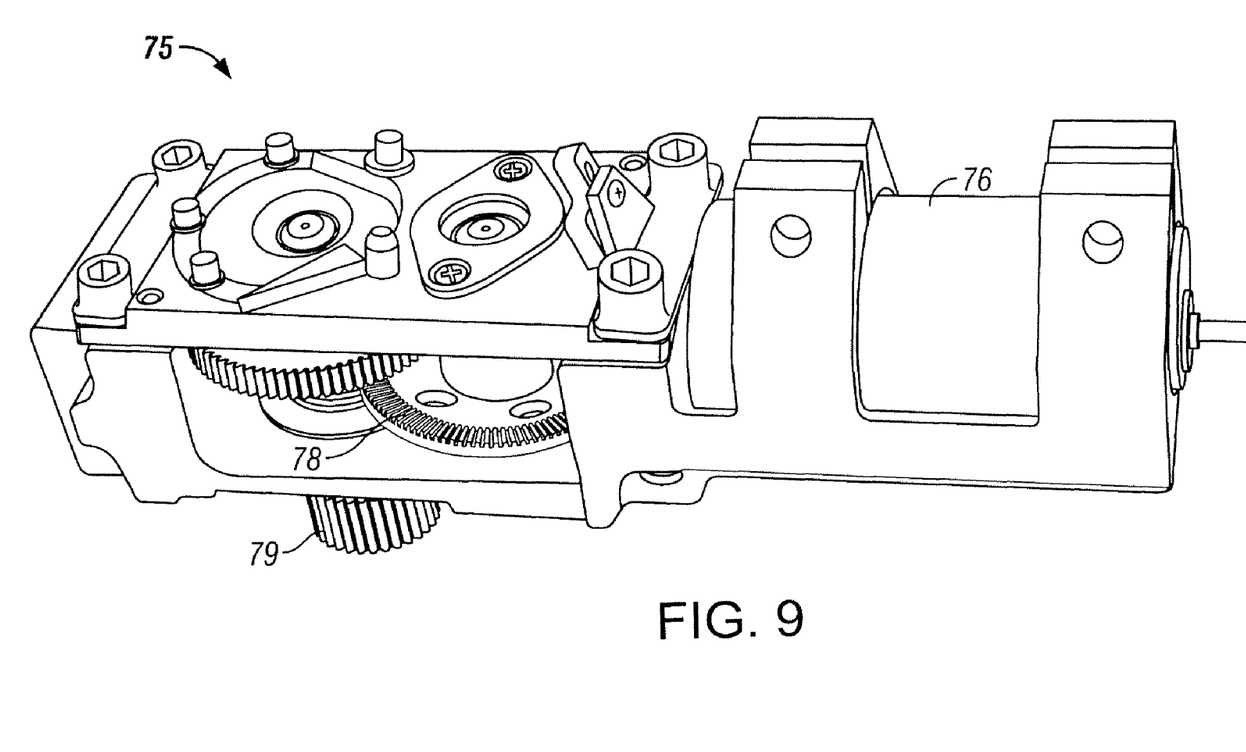
FIG. 9 is a perspective view of a motor assembly as used on the system shown in FIGS. 2-8.

In comparison to previous types of systems, the system 30 shown in FIGS. 1-8 provides improved convenience in balancing, has fewer pinch points providing increased safety in use, and is more compact and lightweight. Referring to FIG. 9, the motor assemblies 75 have gear trains 78 including conical bevel gears. The motor assemblies 75 are compact, to reduce the moments of inertia of the frames supporting them, and to provide a compact design. For providing movement about each axis, the pairs of motors operate on offset amplified signals. The drive signal to each motor is the same, although they are offset from each other. This provides for a linear system and reduces or avoids backlash.

By locating the pan axis motors 72 and 74 on the pan frame 50, and by locating the roll axis motors 82 and 84 on the roll frame 54, the system 30 is made more compact and with less moment of inertia. This allows for more rapid movements. The system 30 is also accordingly more aerodynamically balanced. Consequently, there is less wind load on the system.

During balancing, all motors should be turned off. Accordingly, each time the payload changes, for example, by changing a lens on the camera, power to all motors should be turned off and the system rebalanced. Accordingly, a block power switch 200 controlling power to all motors is preferably provided near the camera, e.g., on the pan frame 50. This allows the assistant camera operator to conveniently turn off power to the motors for balancing. The block power switch 200 preferably controls only power to the motors, and not to the circuitry or sensors.

Thus, novel camera stabilization systems and methods have been shown and described. Various changes may of course be made without departing from the spirit and scope of the invention. The invention, therefore, should not be limited, except by the following claims, and their equivalents.

The invention claimed is:

1. A stabilized camera system, comprising:
    a pan frame;
    a dutch frame pivotably attached to the pan frame, with the dutch frame comprising a parallelogram linkage;
    a tilt frame pivotably attached to the dutch frame;
    a dutch collar at a first end of the parallelogram linkage, and first and second dutch motors linked to the dutch collar.

2. The system of claim 1 wherein the pan frame comprises an arcuate box section.

3. The system of claim 1 further comprising a tilt collar at a second end of the parallelogram linkage, and first and second tilt motors linked to the tilt collar.

4. The system of claim 3 further comprising a pan shaft joined to the pan frame and first and second pan motors linked to the pan shaft.

5. The system of claim 4 further comprising a control system connected to the dutch motors, tilt motors, and pan motors, via wires or cables, for powering and controlling the motors.

6. The system of claim 5 further comprising a limiting mechanism provided at each axis about which the pan frame, the dutch frame, and the tilt frame pivot for preventing excessive winding of the wires or cables.

7. The system of claim 3 wherein the tilt collar includes a tilt shaft pivotable relative to the dutch frame, wherein the tilt frame is supported on the tilt shaft.

8. The system of claim 1 wherein the dutch collar includes a roll shaft pivotable relative to the pan frame, wherein the dutch frame is supported on the roll shaft.

9. The system of claim 1 wherein the tilt frame includes an L-shaped camera platform.

10. The system of claim 1 further comprising locking means for locking the parallelogram linkage into a fixed position.

11. The system of claim 1 further comprising a plurality of locking mechanisms for locking the pan frame, the roll frame, and the tilt frame into fixed positions.

12. A stabilized camera system for attachment to a camera crane, comprising:
    a pan frame rotatably attachable to the camera, crane via a pan shaft;
    a roll frame rotatably attached to the pan frame via a roll collar, with the roll frame comprising a parallelogram linkage;
    a tilt frame rotatably attached to the roll frame via a tilt collar;
    wherein the parallelogram linkage provides a rigid connection between the roll collar and the tilt collar; and
    first and second roll motors linked to the roll collar.

13. The system of claim 12 further comprising first and second tilt motors linked to the tilt collar.

14. The system of claim 12 further comprising first and second pan motors linked to the pan shaft.

15. The system of claim 12 wherein the tilt frame includes an L-shaped camera platform.

16. A stabilized camera system, comprising:
    a pan frame including a pan shaft for attaching the pan frame to a support;
    a roll frame including a parallelogram linkage rotatably attached to the pan frame via a roll collar;
    a tilt frame including an L-shaped camera platform rotatably attached to the roll frame via a tilt collar;
    first and second roll motors linked to the roll collar;
    at least one tilt motor linked to the tilt collar;
    at least one pan motor linked to the pan shaft; and
    a control system linked to the at least one roll motor, tilt motor, and pan motor for powering and controlling the roll motor, tilt motor, and pan motor.

* * * * *